United States Patent
Boyle et al.

(10) Patent No.: US 12,011,977 B2
(45) Date of Patent: Jun. 18, 2024

(54) REMOVABLE REAR WINDOW ASSEMBLY

(71) Applicants: Michael S Boyle, Berkley, MI (US); Jason E Schultz, Clarkston, MI (US); Sahas Chakilam, Novi, MI (US)

(72) Inventors: Michael S Boyle, Berkley, MI (US); Jason E Schultz, Clarkston, MI (US); Sahas Chakilam, Novi, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/124,772

(22) Filed: Dec. 17, 2020

(65) Prior Publication Data
US 2021/0178864 A1 Jun. 17, 2021

Related U.S. Application Data

(60) Provisional application No. 62/949,040, filed on Dec. 17, 2019.

(51) Int. Cl.
*B60J 1/18* (2006.01)
*B60J 1/08* (2006.01)
(Continued)

(52) U.S. Cl.
CPC ............. *B60J 1/1853* (2013.01); *B60J 1/085* (2013.01); *B60J 1/1823* (2013.01); *B60J 1/183* (2013.01);
(Continued)

(58) Field of Classification Search
CPC ........ B60J 1/183; B60J 1/1838; B60J 1/1823; B60J 1/085; B60J 1/1853; B60J 1/005; B60J 1/006; B62D 65/06
(Continued)

(56) References Cited

U.S. PATENT DOCUMENTS 5,015,028 A 5/1991 Bonnett
6,416,104 B1 * 7/2002 Fisher ................. B60N 2/3013
296/190.11
(Continued)

FOREIGN PATENT DOCUMENTS

EP 1184218 B1 1/2007
FR 2985456 A1 7/2013
(Continued)

OTHER PUBLICATIONS

International Search Report and Written Opinion dated Mar. 24, 2021 for International Application No. PCT/US2020/065476, International Filing Date Dec. 17, 2021.

*Primary Examiner* — Amy R Weisberg
*Assistant Examiner* — Wenwei Zhuo
(74) *Attorney, Agent, or Firm* — Jeremy J. Klobucar

(57) ABSTRACT

A vehicle includes a body having a wall extending cross-vehicle and having an upper edge defining a roller surface with at least one locator aperture, a structural frame at least partially defining a rear window opening with the wall, and a removable rear window assembly configured for removable coupling with the vehicle. The removable rear window assembly includes at least one rolling locator assembly configured to roll across the roller surface to support at least a portion of a weight of the rear window assembly to facilitate assisting a user with installing and/or removing the rear window assembly into or out of the rear window opening.

14 Claims, 4 Drawing Sheets

(51) Int. Cl.
  *B60J 7/00* (2006.01)
  *B60J 7/10* (2006.01)
  *B60J 7/11* (2006.01)
  *B62D 33/04* (2006.01)

(52) U.S. Cl.
  CPC .............. *B60J 7/0076* (2013.01); *B60J 7/106* (2013.01); *B60J 7/11* (2013.01); *B62D 33/04* (2013.01)

(58) Field of Classification Search
  USPC .............. 296/201, 147, 148, 146.14, 146.16, 296/107.07
  See application file for complete search history.

(56) References Cited

U.S. PATENT DOCUMENTS

| | | | |
|---|---|---|---|
| 6,460,917 B2 * | 10/2002 | De Paoli | B60J 10/30 296/201 |
| 8,764,095 B2 | 7/2014 | Ritzinger et al. | |
| 2001/0030449 A1 | 10/2001 | De Paoli | |
| 2008/0231072 A1 | 9/2008 | Franco et al. | |
| 2015/0028395 A1 | 1/2015 | Horkheimer et al. | |
| 2018/0010374 A1 * | 1/2018 | Gipson | B60J 1/1853 |
| 2020/0223299 A1 * | 7/2020 | Reiners | B60J 7/08 |

FOREIGN PATENT DOCUMENTS

| | | | |
|---|---|---|---|
| JP | 63176717 A * | 7/1988 | |
| JP | S63176717 A | 7/1988 | |

* cited by examiner

REMOVABLE REAR WINDOW ASSEMBLY

CROSS REFERENCE TO RELATED APPLICATION

This application claims the benefit of U.S. Prov. App. No. 62/949,040, filed Dec. 17, 2019, the contents of which are incorporated herein by reference thereto.

FIELD

The present application relates generally to convertible top systems for a vehicle and, more particularly, to a removable rear window assembly for a vehicle convertible top system.

BACKGROUND

Some vehicles include a removable rear window. However, once removed, the rear window glass does not have a perimeter frame and is therefore exposed and prone to breaking. Additionally, such systems often require a user to get inside of their vehicle to maneuver the window out of its opening, or recruit another person to assist in hoisting the glass from both sides. While these known systems work well for their intended purpose, it is desirable to provide improvements in the relevant art.

SUMMARY

In accordance with an exemplary aspect of the invention, a vehicle is provided. In one example implementation, the vehicle includes a body having a wall extending cross-vehicle and having an upper edge defining a roller surface with at least one locator aperture, a structural frame at least partially defining a rear window opening with the wall, and a removable rear window assembly configured for removable coupling with the vehicle. The removable rear window assembly includes at least one rolling locator assembly configured to roll across the roller surface to support at least a portion of a weight of the rear window assembly to facilitate assisting a user with installing and/or removing the rear window assembly into or out of the rear window opening.

In addition to the foregoing, the described vehicle may include one or more of the following features: wherein the vehicle is a pickup and the wall is a dividing wall between a truck bed cargo area and an interior of the vehicle; wherein the rear window assembly further includes a glass window supported by a window frame; wherein the window frame includes a support bracket extending from a window frame interior surface, and wherein the at least one rolling locator assembly is coupled to the support bracket; and wherein each rolling locator assembly of the at least one rolling locator assembly includes a base member, a roller support coupled to the base member, and a roller rotatably supported by the roller support.

In addition to the foregoing, the described vehicle may include one or more of the following features: wherein the roller support includes a pair of flanges extending from a main body that is coupled to the base member, the pair of flanges rotatably supporting the roller therebetween; wherein the roller support is oriented at an angle relative to a vertical axis such that while the at least one rolling locator assembly rolls along the roller surface, the rear window assembly is oriented at an angle away from structural frame; and wherein the rolling locator assembly further includes a guide arm coupled to and extending from the base member, the guide arm configured to selectively engage an interior surface of the wall to facilitate guiding the rolling locator assembly as it rolls along the roller surface.

In addition to the foregoing, the described vehicle may include one or more of the following features: wherein the guide arm includes a first portion extending from the base member and a second portion extending from the first portion; wherein the first portion is oriented at an angle relative to a vertical axis, and the second portion is oriented substantially along the vertical axis; wherein the at least one locator aperture is configured to receive the at least one rolling locator assembly to facilitate securing the rear window assembly to the wall; wherein the rear window assembly further includes at least one lock configured to selectively engage the structural frame to further secure the rear window assembly to the vehicle; wherein the at least one lock is an L-shaped lock rotatably coupled to a window frame of the rear window assembly; and wherein the structural frame is part of a hard top assembly configured to be removably coupled to the vehicle body.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

According to the principles of the present application, systems and methods are described for convertible top systems for vehicles. In the example embodiments, the convertible top system includes a removable rear window assembly, which provides a user with the benefit of increased open air driving while affording available protection in the event of adverse weather conditions. The system includes a glass window with a protective frame to protect the glass window when removed from the vehicle. Additionally, rolling locators allow for the glass window to be installed from the outside of the vehicle so the user does not require assistance or the need to climb into the back seat in order to remove the glass. The rolling locators allow the weight of the rear window assembly to rest on the vehicle until the assembly is almost completely out, at which point it is easier for the user to lift and remove the rear window assembly.

Figure 1:
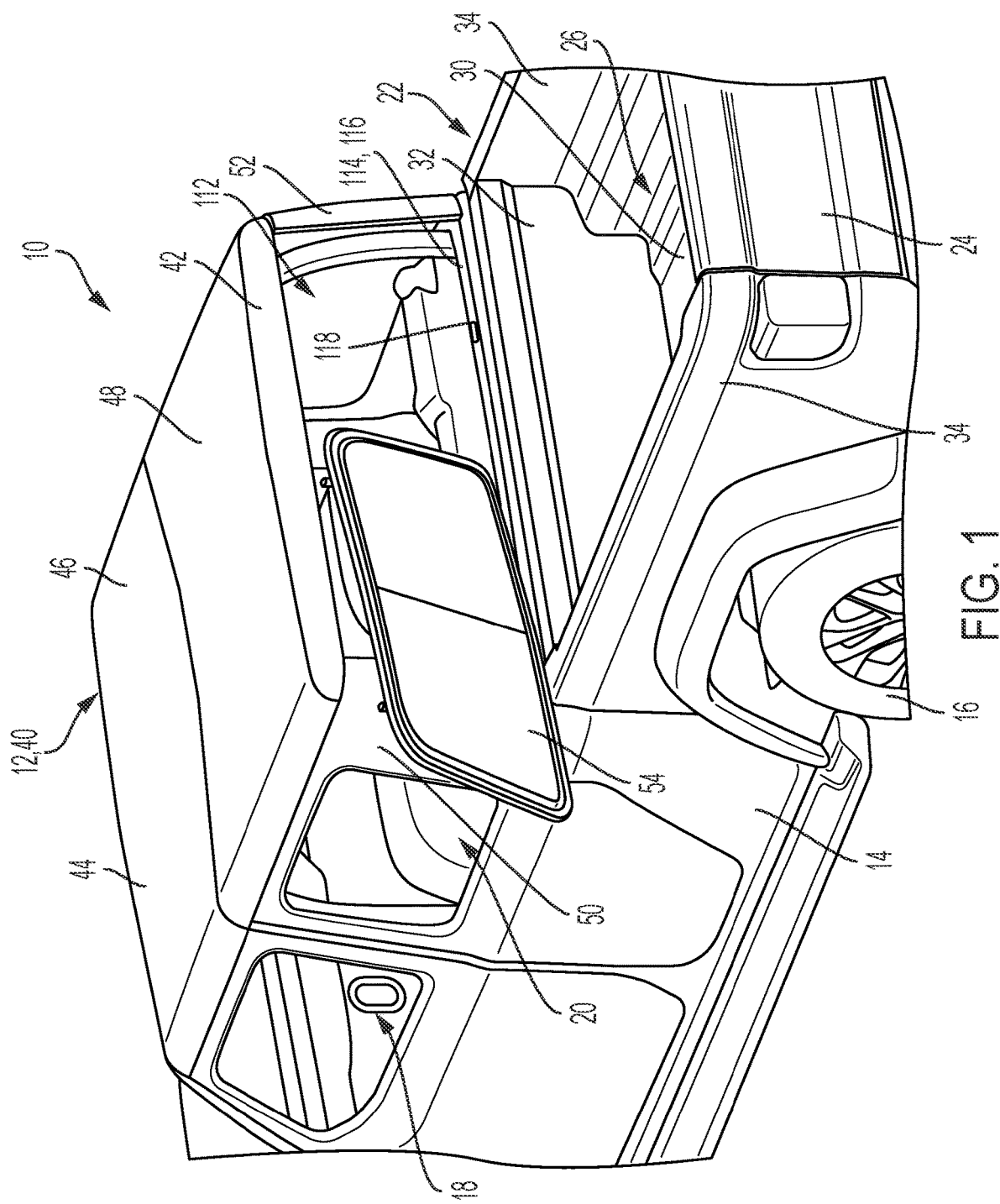
FIG. 1 is a rear perspective view of a vehicle with an example removable rear window assembly in accordance with the principles of the present disclosure.

With initial reference to FIG. 1, a vehicle 10 having a convertible top system 12 in accordance with the principles of the present disclosure is illustrated. In the example embodiment, the vehicle 10 generally includes a vehicle body 14, vehicle wheels 16, front passenger seating 18, rear passenger seating 20, and a storage bed 22 at least partially enclosed by a tailgate 24. In one example implementation, the vehicle 10 is a pickup truck as illustrated. The storage bed 22 provides a truck bed or cargo area 26 defined at least partially by a floor 30, a rear dividing wall 32, side walls 34, and the tailgate 24. As shown, the rear dividing wall 32 separates the cargo area 26 and the vehicle interior, and may include either or both of a forward truck bed wall and an interior cabin rear wall.

With continued reference to FIG. 1, in the example embodiment, the convertible top system 12 is a multi-component hard top assembly 40 that generally includes a base structure or frame 42 configured to removably receive and couple to removable front passenger roof panels 44, 46, removable rear passenger roof panel 48, removable C-pillars 50, 52, and a removable rear window assembly 54. FIG. 1 illustrates the vehicle 10 with the hard top assembly 40 assembled onto the vehicle body 14 with the rear window assembly 54 removed.

In this way, hard top assembly 40 enables the ability to create an open air experience by removing one or more of the front passenger roof panels 44, 46, rear passenger roof panel 48, C-pillars 50, 52, and rear window assembly 54. Unlike a single piece assembly, the hard top assembly 40 includes multiple separately removable panels/windows/components that enable a single person to easily convert the vehicle 10 from the enclosed configuration (hard top assembly attached) to the open-air configuration (hard top assembly, or portions thereof, removed).

Figure 2:
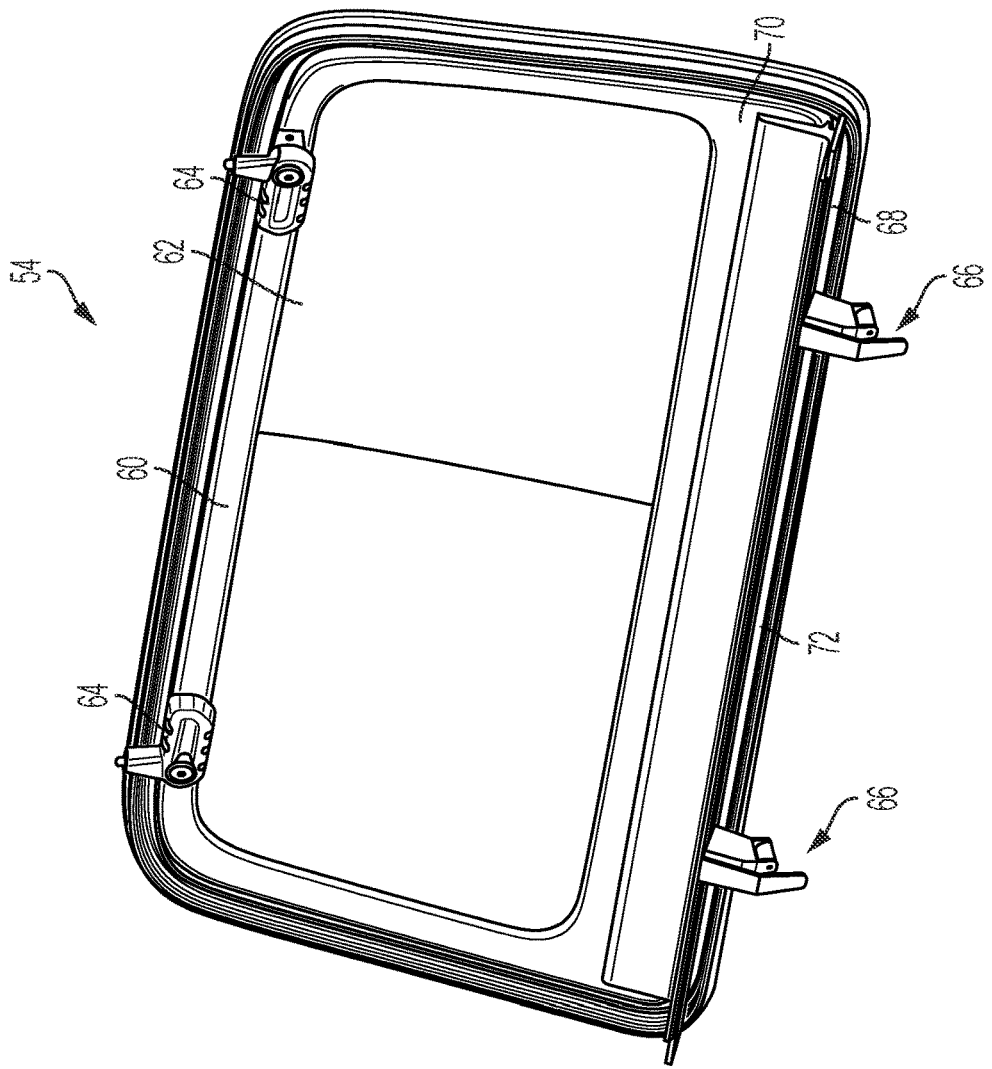
FIG. 2 is a perspective view of the rear window assembly shown in FIG. 1, in accordance with the principles of the present disclosure.

With additional reference to FIG. 2, in one example embodiment, rear window assembly 54 generally includes a frame 60, a glass window 62, one or more L-shaped locks 64, and one or more rolling locator assemblies 66. The frame 60 is configured to receive and support the glass window 62 and includes a support bracket 68 extending from a frame inner surface 70. The one or more L-shaped locks 64 are rotatably coupled to an upper end of the frame inner surface 70 and are configured to rotate between a locked position (shown) that secures the rear window assembly 54 to the frame 42, and an unlocked position that releases the rear window assembly 54 from the frame 42. As show in the illustrated example, the support bracket 68 includes a lower surface 72, which is configured to receive the one or more rolling locator assemblies 66.

Figure 3:
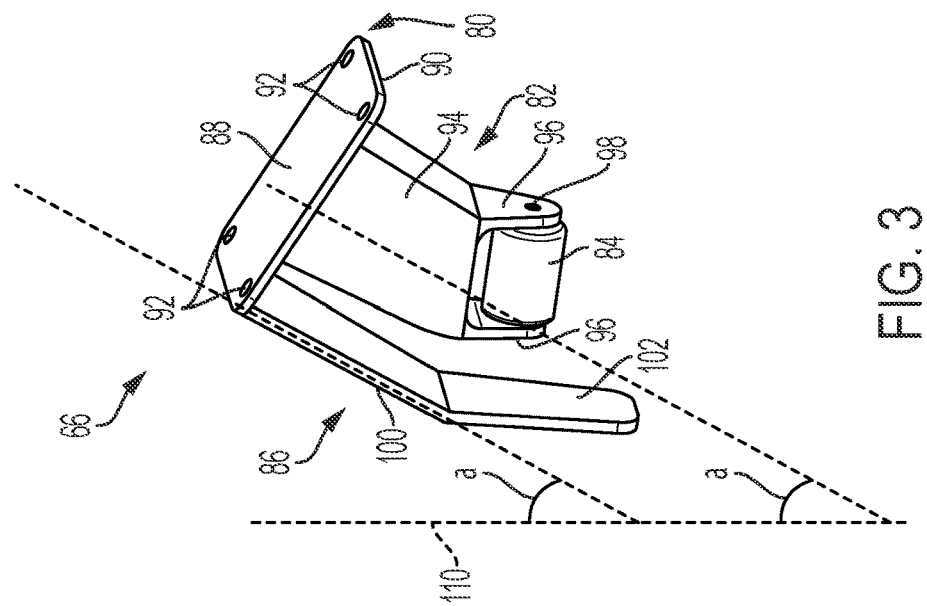
FIG. 3 is a perspective view of an example rolling locator assembly of the rear window assembly shown in FIG. 2, in accordance with the principles of the present disclosure.

With additional reference to FIG. 3, in the example embodiment, the rolling locator assembly 66 generally includes a base plate or member 80, a roller support 82, a roller 84, and a guide member or arm 86. The base member 80 is generally plate-like and includes a first surface 88 and an opposite second surface 90. A plurality of apertures 92 are formed through the base member 80 and configured to receive fasteners (not shown) for coupling the base member 80 to the support bracket 68.

The roller support 82 is coupled to and extends from the base member second surface 90 and includes a main body 94 with a pair of flanges 96 extending from a lower end thereof. Each flange 96 includes an aperture 98 to receive a portion of the roller 84 such that roller 84 is rotatably coupled between the flanges 96. However, it will be appreciated that roller 84 may be rotatably coupled to the flanges 96 in any suitable manner that enables rolling locator assembly 66 to function as described herein. The guide arm 86 extends outwardly from the base member second surface 90 and includes an angled first portion 100 and a vertical or substantially vertical second portion 102.

As shown in FIG. 3, the roller support main body 94 and the guide arm first portion 100 are disposed at an angle 'α' relative to a vertical axis 110, while the guide arm second portion 102 and the flanges 96 are disposed parallel to or substantially parallel to the vertical axis 110. Such an arrangement enables the rear window assembly 54 to be oriented in an installation position angled away from frame 42, and subsequently rotated to an installed position when the rear window assembly 54 is ready to be secured to the frame 42, as described herein in more detail.

Figure 4B:
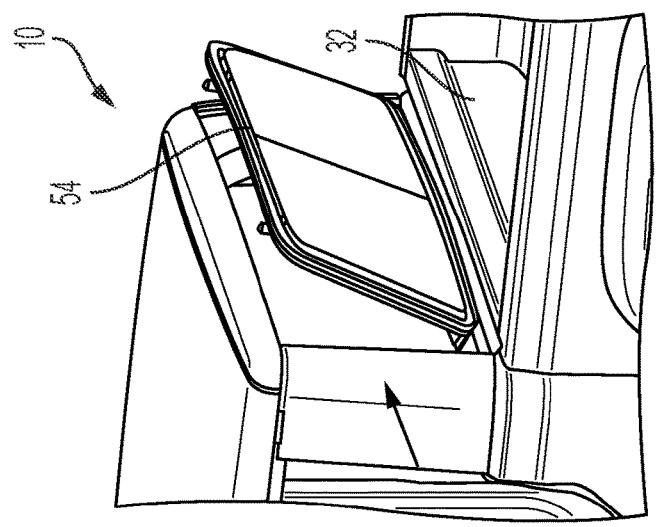
FIG. 4B illustrates perspective and sectional views of a second position during the installation of the rear window assembly shown in FIG. 4A, in accordance with the principles of the present disclosure.
Figure 4B:
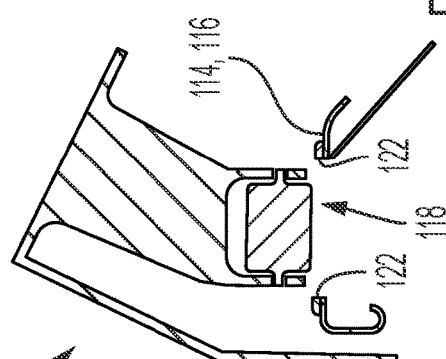
Figure 4A:
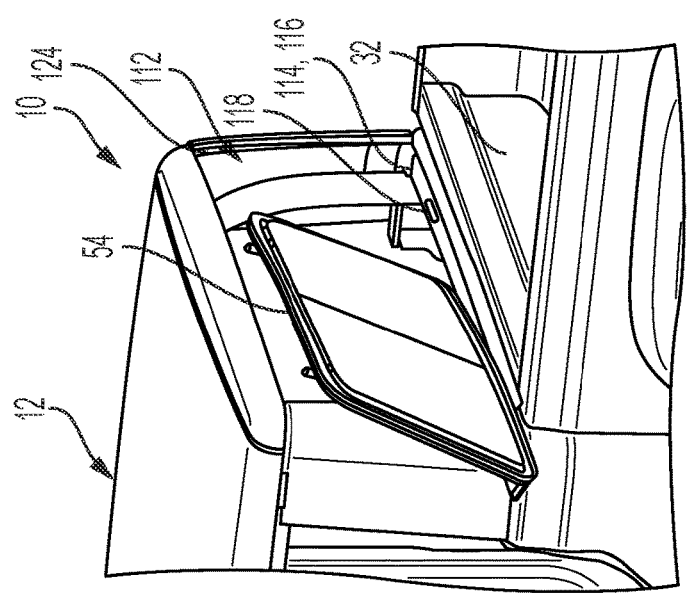
FIG. 4A illustrates perspective and sectional views of a first position during an installation of the rear window assembly shown in FIG. 1, in accordance with the principles of the present disclosure.
Figure 4A:
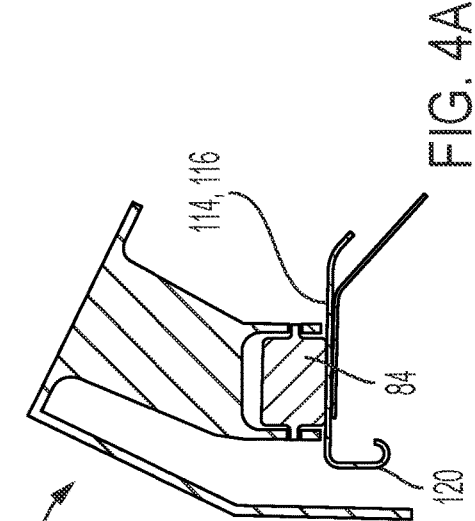

With additional reference to FIGS. 4A-4D, one example installation operation of rear window assembly 54 is illustrated. Initially, a user (not shown) holds the rear window assembly 54 as shown in FIG. 4A at a side of the vehicle 10 proximate the C-pillar 52. As seen in FIGS. 1 and 4A, the hard top frame 42, C-pillars 50, 52, and forward wall 32 define a rear window opening 112. The forward wall 32 includes an upper edge 114 defining a roller surface 116 configured to receive and support roller 84. Additionally, the roller surface 116 defines one or more locator apertures 118 sized and shaped to receive one of the rolling locator assemblies 66.

Accordingly, with the rear window assembly 54 positioned as shown in FIG. 4A, the user positions the roller 84 of the first rolling locator assembly 66 onto the roller surface 116 such that guide arm 86 is positioned inboard of an inner surface 120 of the divider wall 32 (e.g., see lower illustration of FIG. 4A). Because the roller support main body 94 and the guide arm first portion 100 are disposed at angle 'α', the rear window assembly 54 is advantageously angled into the installation position so as not to be obstructed by the frame 42 and C-pillars 50, 52 during installation.

To continue installation, the user pushes and guides the rear window assembly 54 on the roller 84 toward the opposite side of the vehicle until the roller 84 of the second rolling locator assembly 66 can be position onto the roller surface 116. The user continues to push and guide the rear window assembly 54 on the rollers 84 on the roller surface 116 until the rolling locator assemblies 66 reach the locator apertures 118, as shown in FIG. 4B.

Figure 4D:
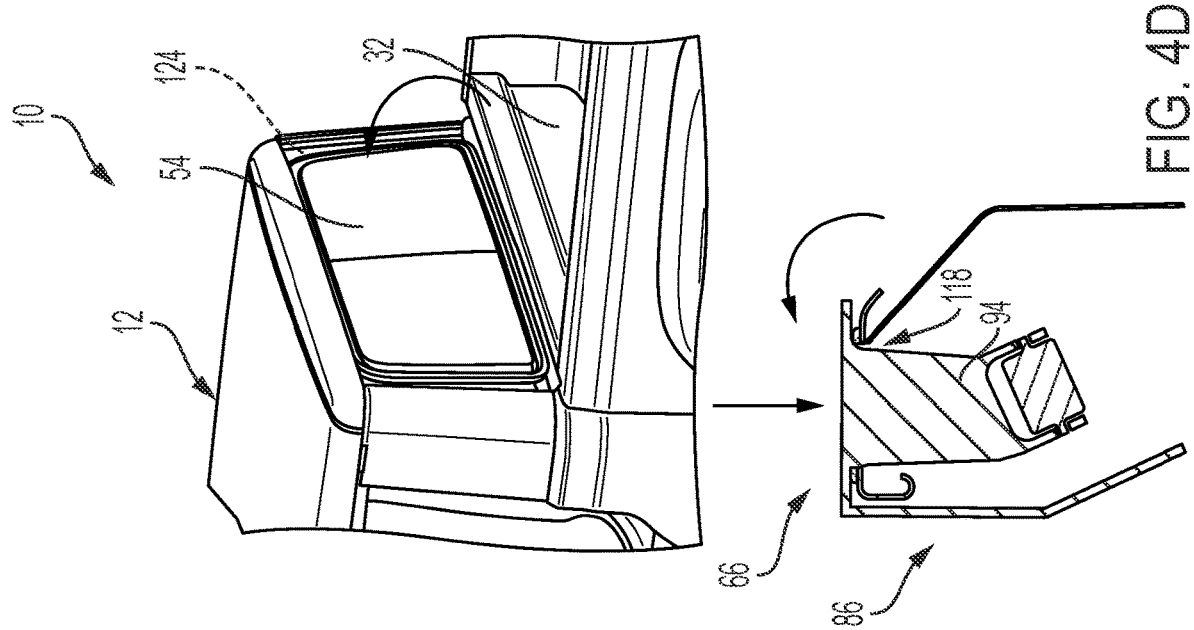
FIG. 4D illustrates perspective and sectional views of a fourth position during the installation of the rear window assembly shown in FIG. 4A, in accordance with the principles of the present disclosure.
Figure 4C:
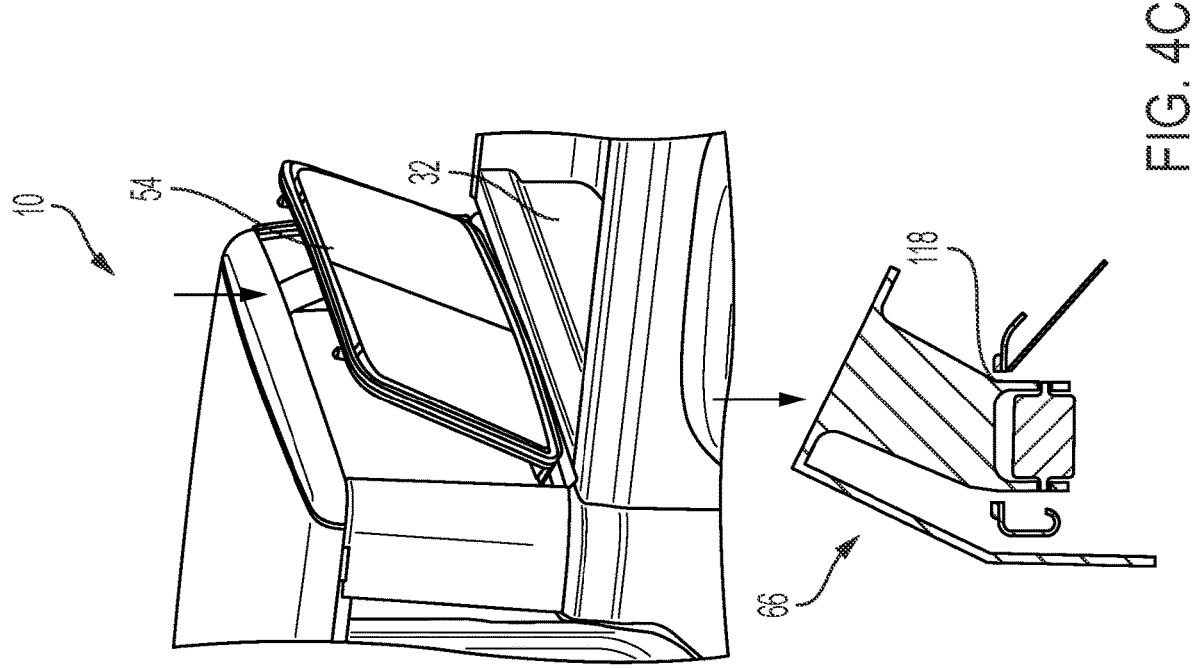
FIG. 4C illustrates perspective and sectional views of a third position during the installation of the rear window assembly shown in FIG. 4A, in accordance with the principles of the present disclosure.

At this point, as shown in FIG. 4C, the rolling locator assemblies 66 fall downward into the locator apertures 118 while the rear window assembly 54 is angled away from hard top frame 42. However, once the angled roller support main body 94 engages the wall edges 122 that define the locator aperture 118, the roller support main body 94 is rotated in order to fit into the locator aperture 118, as shown in FIG. 4D. This rotation of roller support main body 94 causes the rear window assembly 54 to be automatically rotated toward the frame 42 and into the rear window opening 112 against the weather seals 124, as shown in FIG. 4D. Once positioned, the user enters the vehicle and rotates the L-shaped locks 64 into the locked position that secures the rear window assembly 54 to the frame 42. The rear window assembly 54 is thus installed. The steps may then be reversed to remove the rear window assembly 54 from the vehicle 10.

Described herein are systems and methods for a vehicle having a rear window assembly removably coupled to a hard top assembly of the vehicle by one or more rolling locator assemblies. A rear cabin wall defines a lower edge of a rear window opening and includes an upper edge defining a roller surface extending cross-car. The rolling locator assemblies are configured to roll across the roller surface in a cross-car direction to assist the user during installation/removal. As such, the rolling locator assemblies allow a user to stand next to the truck bed and roll the window assembly out of the rear window opening while resting the weight on the rear cabin wall, thus making it easier for a user to remove the glass window fully before needing to actually lift the weight of the part.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A vehicle, comprising:
   a body including a wall extending cross-vehicle and having an upper edge defining a roller surface with at least one locator aperture;
   a structural frame at least partially defining a rear window opening with the wall; and
   a removable rear window assembly configured for removable coupling with the vehicle, the removable rear window assembly including at least one rolling locator assembly configured to roll across the roller surface to support at least a portion of a weight of the rear window assembly to facilitate assisting a user with installing and/or removing the rear window assembly into or out of the rear window opening.

2. The vehicle of claim 1, wherein the vehicle is a pickup and the wall is a dividing wall between a truck bed cargo area and an interior of the vehicle.

3. The vehicle of claim 1, wherein the rear window assembly further includes a glass window supported by a perimeter window frame.

4. The vehicle of claim 3, wherein the window frame includes a support bracket extending from a window frame interior surface, and
   wherein the at least one rolling locator assembly is coupled to the support bracket.

5. The vehicle of claim 1, wherein each rolling locator assembly of the at least one rolling locator assembly includes:
   a base member;
   a roller support coupled to the base member; and
   a roller rotatably supported by the roller support.

6. The vehicle of claim 5, wherein the roller support includes a pair of flanges extending from a main body that is coupled to the base member, the pair of flanges rotatably supporting the roller therebetween.

7. The vehicle of claim 5, wherein the roller support is oriented at an angle relative to a vertical axis such that while the at least one rolling locator assembly rolls along the roller surface, the rear window assembly is oriented at an angle away from structural frame.

8. The vehicle of claim 5, wherein the rolling locator assembly further includes a guide arm coupled to and extending from the base member, the guide arm configured to selectively engage an interior surface of the wall to facilitate guiding the rolling locator assembly as it rolls along the roller surface.

9. The vehicle of claim 8, wherein the guide arm includes a first portion extending from the base member and a second portion extending from the first portion.

10. The vehicle of claim 9, wherein the first portion is oriented at an angle relative to a vertical axis, and the second portion is oriented substantially along the vertical axis.

11. The vehicle of claim 1, wherein the at least one locator aperture is configured to receive the at least one rolling locator assembly to facilitate securing the rear window assembly to the wall.

12. The vehicle of claim 11, wherein the rear window assembly further includes at least one lock configured to selectively engage the structural frame to further secure the rear window assembly to the vehicle.

13. The vehicle of claim 12, wherein the at least one lock is an L-shaped lock rotatably coupled to a window frame of the rear window assembly.

14. The vehicle of claim 1, wherein the structural frame is part of a hard top assembly configured to be removably coupled to the vehicle body.

* * * * *